United States Patent
Lee et al.

(10) Patent No.: US 10,488,617 B2
(45) Date of Patent: Nov. 26, 2019

(54) WEARABLE DISPLAY DEVICE

(71) Applicant: LG Innotek Co., Ltd., Seoul (KR)

(72) Inventors: Sang Hun Lee, Seoul (KR); Kwang Il Kim, Seoul (KR); Yong Bok Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 61 days.

(21) Appl. No.: 15/545,649

(22) PCT Filed: Jan. 15, 2016

(86) PCT No.: PCT/KR2016/000432
§ 371 (c)(1),
(2) Date: Jul. 21, 2017

(87) PCT Pub. No.: WO2016/117879
PCT Pub. Date: Jul. 28, 2016

(65) Prior Publication Data
US 2018/0284388 A1    Oct. 4, 2018

(30) Foreign Application Priority Data

Jan. 23, 2015 (KR) .......... 10-2015-0011028
Jan. 23, 2015 (KR) .......... 10-2015-0011029
Jan. 23, 2015 (KR) .......... 10-2015-0011030

(51) Int. Cl.
*G02B 7/18* (2006.01)
*G02B 17/00* (2006.01)
(Continued)

(52) U.S. Cl.
CPC ......... *G02B 7/1805* (2013.01); *G02B 17/008* (2013.01); *G02B 17/08* (2013.01); *G02B 27/01* (2013.01); *G02B 27/286* (2013.01)

(58) Field of Classification Search
CPC .... G02B 7/1805; G02B 17/08; G02B 17/008; G02B 27/01; G02B 27/0172;
(Continued)

(56) References Cited

U.S. PATENT DOCUMENTS

| | | | |
|---|---|---|---|
| 6,680,802 B1* | 1/2004 | Ichikawa | G02B 27/0172 359/630 |
| 2002/0105738 A1* | 8/2002 | Kobayashi | G02B 5/04 359/834 |
| 2014/0139403 A1 | 5/2014 | Hiraide | |

FOREIGN PATENT DOCUMENTS

| | | |
|---|---|---|
| JP | 2001-108935 A | 4/2001 |
| JP | 2014-202789 A | 10/2014 |

(Continued)

OTHER PUBLICATIONS

International Search Report in International Application No. PCT/KR2016/000432, filed Jan. 15, 2016.

*Primary Examiner* — Jie Lei
(74) *Attorney, Agent, or Firm* — Saliwanchik, Lloyd & Eisenschenk

(57) ABSTRACT

An embodiment of a wearable display device may comprise: a base having a receiving space formed therein; a prism placed in front of an eye of a user, and adjusting the path of light, at least a part of which is incident, to allow a displayed virtual image to arrive at the eye; and a fastening unit for making a part of the prism and a part of the base be fastened to each other, thereby limiting the motion of the prism with respect to the base.

18 Claims, 26 Drawing Sheets

(51) Int. Cl.
*G02B 17/08* (2006.01)
*G02B 27/28* (2006.01)
*G02B 27/01* (2006.01)

(58) Field of Classification Search
CPC .............. G02B 27/0176; G02B 27/286; G02B 2027/0178; G02B 5/04; G02B 5/045
USPC ......... 359/13, 629–633, 505, 726, 831, 833, 359/834; 345/7, 8
See application file for complete search history.

(56) References Cited

FOREIGN PATENT DOCUMENTS

| | | |
|---|---|---|
| KR | 10-2001-0048012 A | 6/2001 |
| KR | 10-2008-0044040 A | 5/2008 |

\* cited by examiner

WEARABLE DISPLAY DEVICE

CROSS-REFERENCE TO RELATED APPLICATIONS

This application is the U.S. national stage application of International Patent Application No. PCT/KR2016/000432, filed Jan. 15, 2016; which claims priority to Korean Application Nos. 10-2015-0011028, 10-2015-0011029, and 10-2015-0011030, all filed Jan. 23, 2015; the disclosures of each of which are incorporated herein by reference in their entirety.

TECHNICAL FIELD

Embodiments relate to a wearable display device.

BACKGROUND ART

The content described in this section merely provides background information regarding embodiments, and does not constitute the prior art.

A wearable display device, such as, for example, a head-mounted display (HMD), is a device that is devised to let a pilot know flight information including, for example, the altitude and speed of an airplane. General commercial products were invented in the 1990s, and commercialized products have received great attention since 1997.

A wearable display device is a device that is worn on the head, like a pair of glasses, so that an enlarged image is formed in front of the user's eyes so as to allow the user to view the image, and a display having a size of 1 inch or less is generally used therein, but the user can perceive an enlarged screen approaching 100 times the actual size through the application of high-grade optical technology.

The growth of the wearable computing industry is expected due to the technical development and commercialization of peripheral appliances such as wearable display devices. Although current wearable display devices have mainly been developed for the enjoyment of movies or games, owing to the higher performance and smaller size of computer systems and to the rapid development of display apparatuses, which are exemplified by LCDs and LEDs, and of image communication technology, wearable display devices have recently been studied and developed for use as wearable monitors, and commercialized products based thereon have been launched.

Although the wearable display device market has encountered difficulty in the past due to relatively high prices, it is expected that the market will rapidly grow along with the wearable computer industry. The application fields of wearable display devices are expected to expand to industrial sites, sites for the maintenance of bulky products such as, for example, cars, airplanes, and ships, and warehouses, as well as to sports entertainment, such as car racing.

In particular, the development of processor and software technologies enables a reduction in the size of computing apparatuses, and wearable display devices are expected to be developed for use in personal-computing apparatuses, such as smart phones, rather than serving as a device that merely displays an image.

In the wearable display device, the light that is transmitted to the user's eyeball follows a predetermined path, and the performance of the product is determined by stable maintenance of the path of the light. In the process of assembling various components to manufacture the wearable display device, a prism, through which light passes at a final step in order to be introduced into the user's eyeball, is coupled to a base; however, the prism may undesirably move relative to the base without being securely coupled to the base.

If the prism moves relative to the base, the path of light does not remain stable, which may cause deterioration in the quality of the wearable display device.

In order to solve this problem, the base and the prism may be securely coupled to each other using an adhesive material; however, there is a concern that the adhesive material may flow down and contaminate the wearable display device and therefore may deteriorate the operational performance and the image quality. Further, because an adhesive material does not provide sufficient coupling strength for the components, there is still a problem in that the prism may move relative to the base.

In the process of assembling various components to manufacture the wearable display device, a prism, through which light passes at a final step in order to be introduced into the user's eyeball, may include a plurality of sub-prisms, which may be coupled to each other using an adhesive agent.

If the adhesive agent flows down to regions other than the regions of the sub-prisms that are bonded to each other by the adhesive agent, this may have a negative influence on the light that passes through the prism, which may result in deterioration of the performance of the wearable display device.

When various components of the wearable display device are coupled to each other, the components, through which light passes, need to be securely coupled to each other in order to prevent the light from being distorted by shaking.

DISCLOSURE

Technical Problem

Therefore, embodiments provide a wearable display device having a structure capable of greatly restricting the movement of a prism relative to a base.

Further, embodiments provide a wearable display device having a structure capable of facilitating adhesion between sub-prisms and preventing an adhesive agent from exerting a negative influence on the path of light that passes through a prism.

Further, embodiments provide a wearable display device having a structure in which components, through which light passes, are securely coupled to each other so as to prevent the light from being distorted by shaking.

Objects to be accomplished by the embodiments are not limited to the above-mentioned objects, and other objects not mentioned will be clearly understood by those skilled in the art from the following description.

Technical Solution

In one embodiment, a wearable display device includes a base having an accommodation space formed therein, a prism disposed in front of an eyeball of a user, the prism including at least a portion for allowing a displayed virtual image to reach the eyeball by adjusting a path of light introduced thereto, and a fastening unit for fastening a portion of the prism and a portion of the base to each other so as to restrict movement of the prism relative to the base.

In another embodiment, a wearable display device includes a first prism disposed in front of an eyeball of a user to allow a displayed image to reach the eyeball by adjusting a path of light introduced to the eyeball, and a second prism coupled to the first prism, wherein at least one of the first prism and the second prism has an adhesion groove for receiving an adhesive agent introduced thereinto, the adhesion groove being formed in at least one of a surface of the first prism and a surface of the second prism that is configured to be coupled to the surface of the first prism.

In a further embodiment, a wearable display device includes a first prism disposed in front of an eyeball of a user to allow a displayed image to reach the eyeball by adjusting a path of light introduced to the eyeball, and a second prism coupled to the first prism to reduce distortion of a real image that reaches the eyeball of the user, wherein the first prism has a first surface configured to be coupled to the second prism and the second prism has a second surface configured to be coupled to the first prism, and at least one of the first surface and the second surface has an adhesion groove formed therein so as to receive an adhesive agent introduced thereinto.

In a further embodiment, a wearable display device includes a polarizer, a lens through which image-forming light transmitted from the polarizer passes, a prism into which the image-forming light that has passed through the lens is introduced, a base to which the lens and the prism are coupled, and a coupling unit for coupling at least one of the lens and the prism to the base at an inner bottom surface of the base on a basis of a viewing direction of a user.

In a further embodiment, a wearable display device includes a polarizer, a lens through which image-forming light transmitted from the polarizer passes, a prism into which the image-forming light that has passed through the lens is introduced, and a base to which the lens and the prism are coupled, wherein the base has bosses formed on an inner bottom surface thereof on a basis of a viewing direction of a user in order to allow coupling with the lens or the prism, and the lens or the prism has insert recesses formed in portions thereof corresponding to positions of the bosses in order to allow the bosses to be inserted thereinto.

Advantageous Effects

According to the embodiments, the fastening unit is capable of greatly reducing change and distortion of the path of the light that passes through various components accommodated in an accommodation space in the base and the prism, which may be caused when the prism coupled to the base moves, for example rotates, relative to the base. Therefore, the fastening unit maintains a stable path of light, thereby providing an effect of improving the performance of the wearable display device.

According to the embodiments, by virtue of adhesion grooves formed in the surface of the first prism or the second prism, there is an effect in that the first prism and the second prism are easily and securely coupled to each other using an adhesive agent.

According to the embodiments, a boss and an insert recess, which is disposed so as to face the boss, are formed in the bottom surface of the lens, the bottom surface of the prism and the inner bottom surface of the base so as to be coupled to each other, and the boss and the insert recess are respectively provided in a plural number, thereby achieving secure coupling between the lens and the base and between the prism and the base.

BEST MODE

Figure 1:
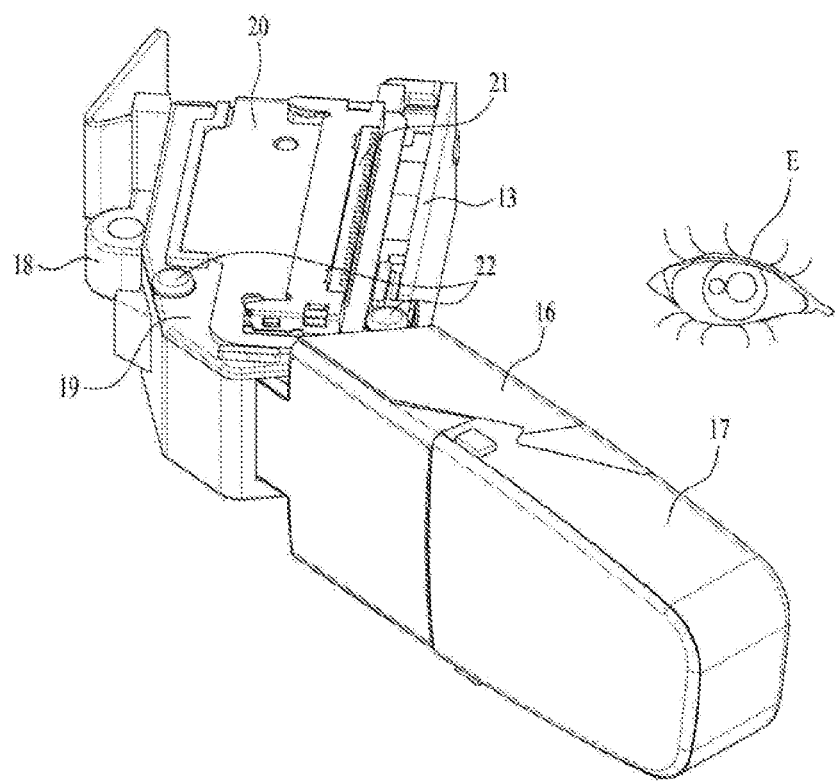
FIG. 1 is a perspective view illustrating a wearable display device according to one embodiment.

Hereinafter, embodiments will be described in detail with reference to the accompanying drawings. While the disclosure may be subject to various modifications and alternative forms, specific embodiments thereof are shown by way of example in the drawings and are explained in detail in the description. However, the disclosure should not be construed as being limited to the embodiments set forth herein, but on the contrary, the disclosure is intended to cover all modifications, equivalents, and alternatives falling within the spirit and scope of the embodiments. In the drawings, the sizes and shapes of elements may be exaggerated for convenience and clarity of description.

It may be understood that, although the terms "first," "second," etc. may be used herein to describe various elements, these elements should not be limited by these terms. These terms are generally only used to distinguish one element from another. In addition, terms particularly defined in consideration of the construction and operation of the embodiments are used only to describe the embodiments, but do not define the scope of the embodiments.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

In addition, relational terms, such as "on/upper part/above" and "under/lower part/below," are used only to distinguish between one subject or element and another subject or element without necessarily requiring or involving any physical or logical relationship or sequence between such subjects or elements.

In addition, an orthogonal coordinate system (x, y, z) may be used in the drawings. In each drawing, the x-axis and the y-axis are perpendicular to an optical-axis direction, and for convenience, the optical-axis direction (the z-axis direction) may be referred to as a first direction, the x-axis direction may be referred to as a second direction, and the y-axis direction may be referred to as a third direction.

A wearable display device according to the embodiments is a device that is wearable on the human body, like a pair of glasses, and allows a human to view an image transmitted from an external apparatus with fewer limitations as to place. The apparatus, which is the source of the transmitted image, may be a smart phone or any other mobile appliance, and may be connected to the wearable display device in a wired or wireless manner.

At this time, in order to wear the wearable display device according to the embodiments, the wearable display device may be removably coupled to glasses, or may be coupled to a separate wearable appliance, which may be worn on the user in the manner of a pair of glasses.

Figure 2:
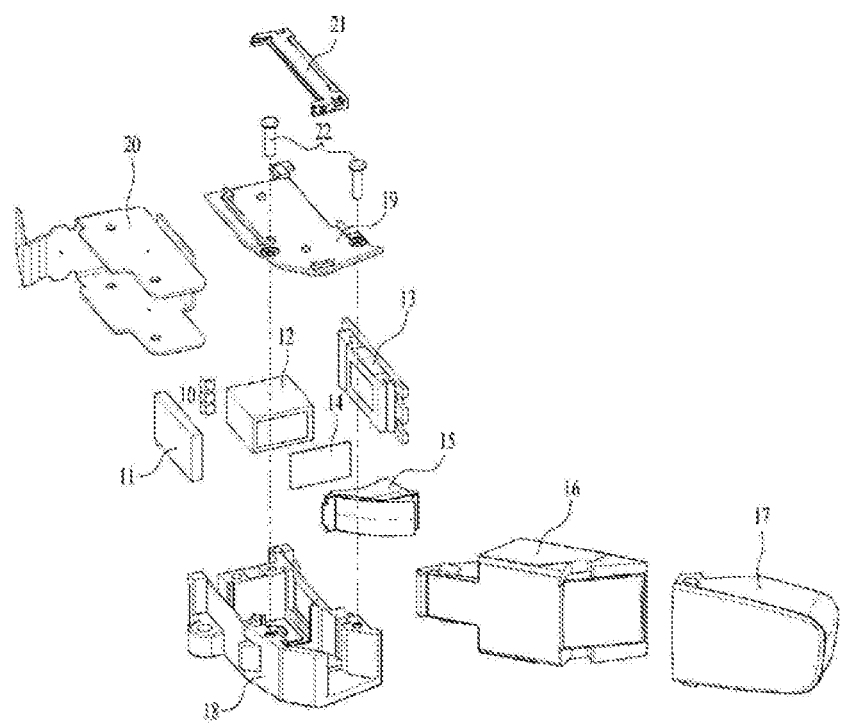
FIG. 2 is an exploded perspective view illustrating the wearable display device according to the embodiment.
Figure 3:
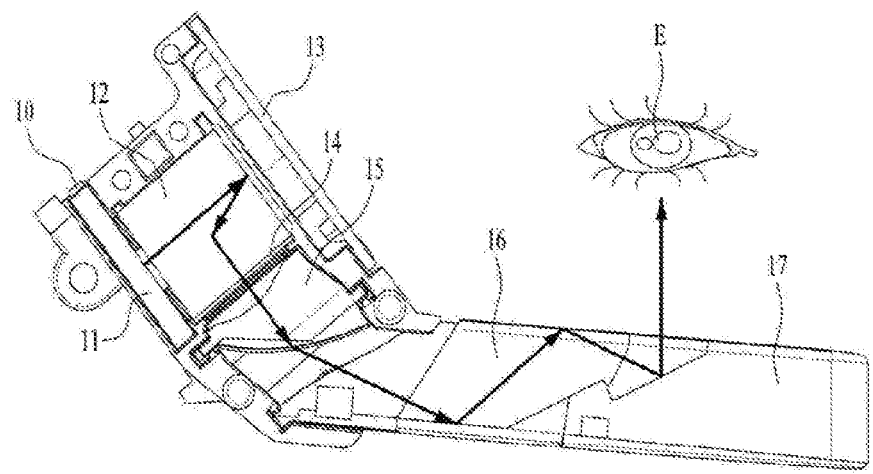
FIG. 3 is a plan view illustrating a path of light that forms a virtual image in the wearable display device according to the embodiment.

FIG. 1 is a perspective view illustrating a wearable display device according to one embodiment. FIG. 2 is an exploded perspective view illustrating the wearable display device according to the embodiment. FIG. 3 is a plan view illustrating a path of light that forms a virtual image in the wearable display device according to the embodiment.

The wearable display device according to the embodiment may include a light source unit 10, a light guide unit 11, a beam ejection unit 12, a display unit 13, a polarizer 14, a lens 15, a first prism 16, and a second prism 17.

In addition, the wearable display device according to the embodiment may include a base 18, a cover member 19, and fastening members 22, in order to couple the respective components mentioned above into a bundle. In addition, the wearable display device of the embodiment may include a printed circuit board 20 and a connector 21, which may electrically connect the wearable display device to an external apparatus, and may allow the wearable display device to receive a playback image from the external apparatus.

The light source unit 10 may be electrically connected to the printed circuit board 20, and may serve to perform first emission of a playback image, which is transmitted from the external apparatus via the printed circuit board 20, in the form of light. The light source unit 10 may be formed of various devices that emit light, and, for example, may be formed of small LEDs, which have excellent durability and emit less heat.

The light guide unit 11 may serve to adjust the path of light so that the image emitted from the light source unit 10 is directed to the beam ejection unit 12. As shown in FIG. 3, when viewing the vicinity of the light guide unit 11, the light source unit 10 and the beam ejection unit 12 are arranged approximately perpendicular to each other. As such, in order to direct the light that forms an image and is emitted from the light source unit 10 to the beam ejection unit 12, the light guide unit 11 may include a plurality of lattices, which are located at appropriate positions and are oriented at appropriate angles within the light guide unit 11.

In addition, the light guide unit 11 may serve to uniformly distribute the light, emitted from the light source unit 10, to the beam ejection unit 12, through the provision of the lattices. Accordingly, the light, uniformly emitted from the light guide unit 11, may be uniformly introduced to the surface of the beam ejection unit 12 that is close to the light guide unit 11.

The beam ejection unit 12 may serve to emit the light, introduced from the light guide unit 11, to the display unit 13, and to emit a playback image, received from the display unit 13, to the lens 15 in order to allow a user to concretely view the image with the naked eye.

That is, the beam ejection unit 12 may transmit light to the display unit 13 or may receive the light that forms a playback image from the display unit 13, and may adjust the path of the light that forms the playback image and is received from the display unit 13.

In order to form the path of light, the beam ejection unit 12 may take the form of a polarizing beam splitter (PBS), for example. The polarizing beam splitter may be manufactured by coupling a plurality of lattices and forming a thin film, which is capable of reflecting and/or diffracting light, on each lattice.

The display unit 13 serves to convert the light introduced from the beam ejection unit 12 into a playback image, the form of which the user is capable of concretely detecting with the naked eye. The display unit 13 may be, for example, a reflective display, which emits the playback image back to the beam ejection unit 12.

The reflective display may be of, for example, an L cos type. The L cos-type reflective display plays an image back by reflecting the light introduced thereinto. In the L cos type, a silicon substrate is mainly used as a display device, and a high-resolution image may be displayed on a small display screen.

The polarizer 14 may serve to polarize the image-forming light introduced from the display unit 13. The polarizer 14 may serve to transmit a p-wave component of the introduced image-forming light and absorb an s-wave component of the introduced image-forming light.

At this time, the p-wave is a light wave that vibrates in the direction parallel to an incident plane, and the s-wave is a light wave that vibrates in the direction perpendicular to an incident plane. Here, "incident plane" refers to a plane that is defined by an incident light wave, a reflected light wave, and a transmitted light wave in a medium into which light is introduced.

The polarizer 14 transmits only the p-wave light, among the incident light, and therefore the light that passes through the polarizer 14 and is introduced to the lens 15 includes only the p-wave component. Of course, conversely, the light that passes through the polarizer 14 and is introduced to the lens 15 may include only the s-wave component when some other kind of polarizer 14 is used.

The above-mentioned polarizer 14 may prevent deterioration in image quality due to interference between the p-wave component and the s-wave component of light, which occurs when the incident light that forms an image includes both the p-wave component and the s-wave component.

Meanwhile, in the same manner as the polarizer 14, the light guide unit 11 may have a polarization function so as to prevent deterioration in image quality due to the inference between the p-wave component and the s-wave component of light by polarizing the light introduced from the light source unit 10.

The lens 15 may serve to receive the image-forming light introduced from the polarizer 14 and enlarge an image. That is, because the image formed by the light introduced from the polarizer 14 is very small, it is inconvenient for the user to view the image. Therefore, the lens 15 serves to enlarge the image to a size suitable for viewing by the user with the naked eye.

The light, which has formed the enlarged image by passing through the lens 15, is introduced to the first prism 16. At this time, in order to appropriately adjust the path of the light introduced from the lens 15 to the first prism 16, a refractor may be formed on a portion of the lens 15 as needed. The refractor may be formed, for example, by coupling a medium, having a density different from that of the remaining portion of the lens 15, to a portion of the lens 15.

The first prism 16 may serve to allow the image transmitted from the lens 15 to reach the user's eyeball E. To this end, the path of the image-forming light introduced from the lens 15 needs to be appropriately adjusted. The adjustment of the path of light may be accomplished using total reflection in the first prism 16, and a reflective layer (not shown), which will be described later, may be formed on the first prism 16 in order to adjust the final path of the light that is introduced to the user's eyeball E.

At this time, the image, which is directed from the lens 15 to the user's eyeball E through the first prism 16, is a virtual image. That is, unlike a real image, which is an image of a real object located in front of the user's eyeball E, the image is a virtual image that the user visually perceives, which is not located in front of the user's eyeball E, but is played back on the display unit 13 as if it were located in front of the user's eyeball E owing to the adjustment of the path of light, as described above.

In the wearable display device of the embodiment, the path of the light that forms the virtual image is as illustrated in FIG. 3. Specifically, first, the light source unit 10, which is electrically connected to the printed circuit board 20, receives information about a playback image from the external apparatus through the printed circuit board 20 and emits light containing the image to the light guide unit 11. At this time, the light emitted from the light source unit 10 may include an RGB signal.

Subsequently, the light guide unit 11 adjusts the path of the light introduced from the light source unit 10 so that the light is directed to the beam ejection unit 12. At this time, the light guide unit 11 may serve to uniformly distribute the light emitted from the light source unit 10 to the beam ejection unit 12 owing to the lattices thereof. In addition, the light guide unit 11 may have a polarization function so as to prevent deterioration in image quality due to interference between the p-wave component and the s-wave component of light by polarizing the light introduced from the light source unit 10.

Subsequently, the beam ejection unit 12 may emit the light, introduced from the light guide unit 11, to the display unit 13 so that the display unit 13 plays back an image, which the user is capable of concretely perceiving with the naked eye, using the incident light.

Subsequently, the display unit 13 plays back an image using the light introduced from the beam ejection unit 12, and the light that forms the playback image is emitted back to the beam ejection unit 12.

Subsequently, the beam ejection unit 12 emits the image-forming light, introduced from the display unit 13, to the polarizer 14. At this time, the beam ejection unit 12 may take the form of a polarizing beam splitter as described above in order to adjust the path of light in various ways.

Subsequently, the polarizer 14 polarizes the image-forming light introduced from the beam ejection unit 12. At this time, because the polarizer 14 transmits only one of the p-wave component and the s-wave component of the light and absorbs the other light wave, the light that passes through the polarizer 14 is polarized so as to have only one of the p-wave component and the s-wave component of light. This serves to prevent deterioration in image quality due to interference between the p-wave component and the s-wave component of light, as described above.

Subsequently, the lens 15 serves to receive and enlarge the image-forming light, introduced from the polarizer 14, to a size suitable for viewing by the user with the naked eye. At this time, as described above, a refractor may be formed on a portion of the lens 15 for adjustment of the path of light, and the light that passes through the refractor is introduced to the first prism 16 at a set angle of incidence.

Subsequently, the first prism 16 may serve to adjust the path of the image-forming light transmitted from the lens 15 and to finally emit the image-forming light to the user's eyeball E. At this time, the adjustment of the path of light may be implemented using total reflection in the first prism 16 or the reflective layer formed on the first prism 16.

The second prism 17 may be coupled to the first prism 16 and may serve to reduce the distortion of the real image that reaches the user's eyeball E. The user can simultaneously view both the virtual image, which is the image played back on the display unit 13, and the real image of an object that is present in front of the user's eyeball E, via the first prism 16.

However, when the user's eyeball E and the end of the first prism 16 are arranged close to each other, the real image, which reaches the user's eyeball E, may be distorted due to the shape of the end of the first prism 16. This is because refraction, diffraction or the like of the light that shows the real image may occur due to the shape of the end of the first prism 16.

Therefore, when the second prism 17 is coupled to the end of the first prism 16 so that the entire prism is extended, it is possible to reduce the distortion of the real image caused by the shape of the end of the first prism 16.

The base 18 may have an accommodation space S formed therein, and may serve to accommodate the light guide unit 11, the beam ejection unit 12, the display unit 13, the polarizer 14, and the lens 15 in the accommodation space. The base 18 may have a complicated shape because it accommodates various components of the embodiment. Therefore, the base 18 may be manufactured using a method that enables the manufacture of a complicated structure, for example, injection molding.

The cover member 19 may close at least a portion of the top of the base 18 so as to allow the respective components to be stably accommodated in the base 18. In addition, the cover member 19 may be coupled to the base 18 by the fastening members 22.

In addition, protruding portions 171 may be formed on the upper surface of the cover member 19, and may be coupled to recesses or holes formed in the printed circuit board 20, whereby the top of the printed circuit board 20 may be coupled to the cover member 19.

The top and bottom of the printed circuit board 20 may be coupled to the base 18 and the cover member 19, and may be electrically connected to the light source unit 10 and the display unit 13. In this way, the printed circuit board 20 may transmit an image signal to be played back to the light source unit 10, and may supply required power to the light source unit 10 and the display unit 13.

Meanwhile, the printed circuit board 20 may have recesses or holes formed in the top and bottom thereof. As such, the top and bottom of the printed circuit board 20 may be respectively coupled to the protruding portions 171 formed on the upper surface of the cover member 19 and the protruding portions 171 formed on the lower surface of the base 18.

The connector 21 may serve to connect the printed circuit board 20 and an external apparatus to each other. At this time, the external apparatus may include, for example, a controller, which controls the wearable display device of the embodiment, a storage device in which images to be played back are recorded, and a communication device, which may link a mobile appliance, such as, for example, a smart phone, to the wearable display device.

The fastening members 22 may serve to couple the cover member 19 and the base 18 to each other. Thus, the fastening members 22 may be any fastening members, so long as they can be inserted into the holes or recesses formed in each of the cover member 19 and the base 18 so as to removably couple the cover member 19 and the base 18. For example, the fastening members 22 may be bolts, screws, or coupling pins.

Figure 4A:
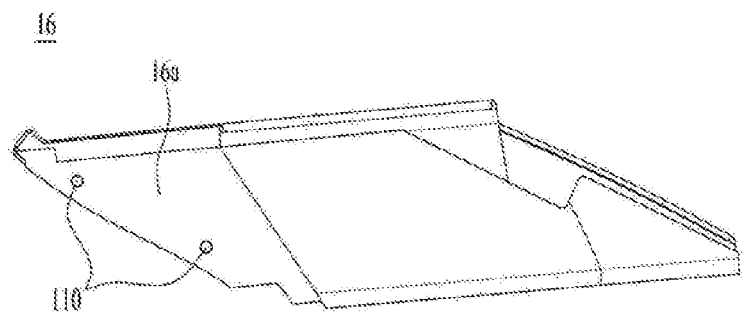
FIGS. 4A and 4B are views for explaining the coupling state between a first prism and a base according to one embodiment.
Figure 4B:
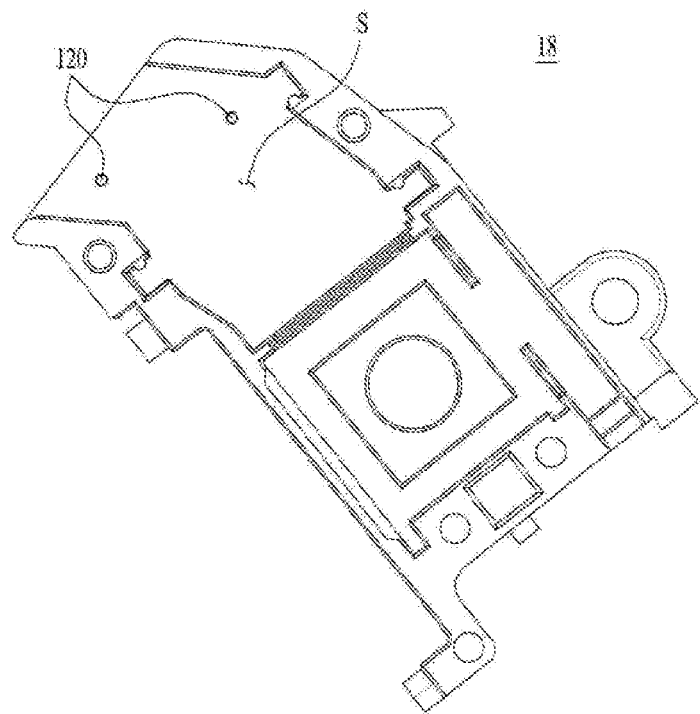

FIGS. 4A and 4B are views for explaining the coupling state between the first prism 16 and the base 18 according to one embodiment. The prism is coupled to the base 18, and according to the embodiment, there may be provided a fastening unit for coupling the first prism 16 to the base 18.

At this time, the fastening unit may restrict the movement of the prism relative to the base 18 by enabling a portion of the prism and a portion of the base 18 to be coupled to each other. That is, in the embodiment, the fastening unit is capable of greatly reducing change and distortion of the path of the light that passes through various components accommodated in the accommodation space S in the base 18 and the prism, which may be caused when the prism coupled to the base 18 moves, for example rotates, relative to the base 18. Therefore, the fastening unit maintains a stable path of light, thereby providing an effect of improving the performance of the wearable display device.

In an example, the fastening unit may include a plurality of coupling protrusions 110, which are formed on one end portion of the prism, and insert portions 120, which are formed in a portion of the base 18 at one end that corresponds to the positions of the coupling protrusions 110 and are formed in the same number as the number of the coupling protrusions 110. At this time, the insert portions 120 may be embodied as, for example, holes or recesses, into which the coupling protrusions 110 are inserted.

At this time, although the coupling protrusions 110, as shown in FIG. 4A, are illustrated as having a circular planar shape, the disclosure is not limited thereto, and the planar shape of the coupling protrusions 110 may be polygonal, such as, for example, triangular or quadrangular, elliptical, or various other shapes.

Further, the fastening unit according to the embodiment, as shown in FIGS. 4A and 4B, may be constructed such that the coupling protrusions 110 protrude from a bottom surface 16a of the first prism 16 and the insert portions 120 are formed in the bottom of the base 18 at positions corresponding to the positions of the coupling protrusions 110.

At this time, the coupling protrusions 110 may be provided in a plural number in order to restrict the rotation of the first prism 16, which is coupled to the base 18, relative to the base 18. Further, under the condition that the coupling protrusions 110 are provided in a plural number and the region for coupling to the base 18 is restricted to one end portion of the bottom surface 16a of the first prism 16, the number and position of the coupling protrusions 110 may be variously selected.

Figure 5A:
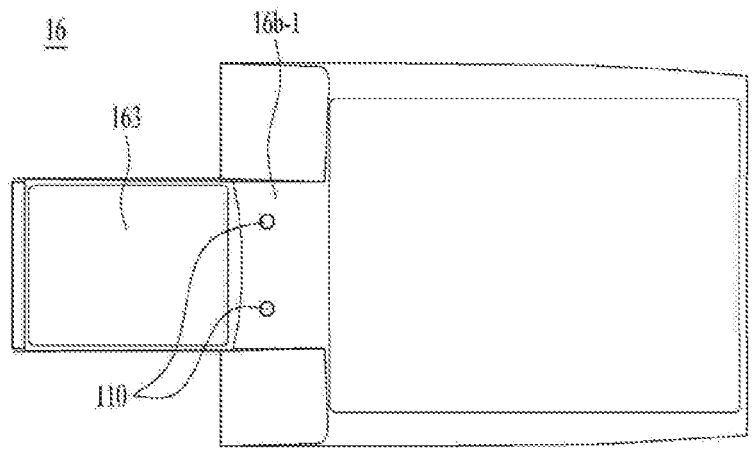
FIGS. 5A and 5B are views for explaining the coupling state between the first prism and the base according to another embodiment.
Figure 5B:
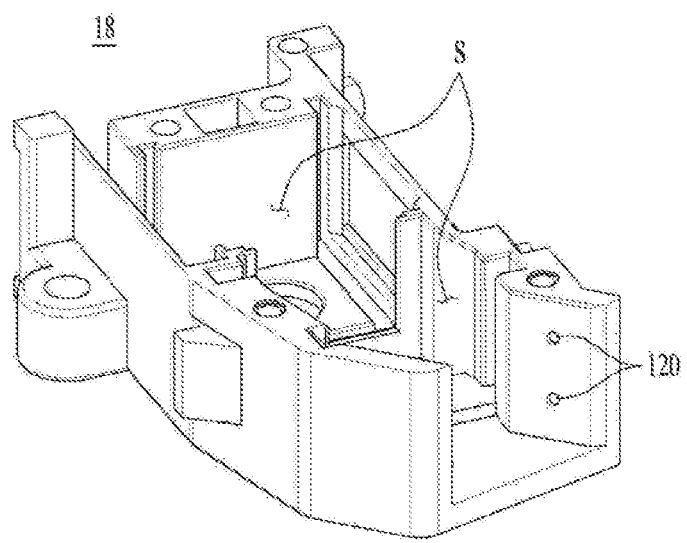

FIGS. 5A and 5B are views for explaining the coupling state between the first prism 16 and the base 18 according to another embodiment. The fastening unit according to this embodiment, as shown in FIGS. 5A and 5B, may be constructed such that the coupling protrusions 110 protrude from one side surface 16b-1 of the first prism 16 and the insert portions 120 are formed in a side portion of the base 18 that corresponds to the positions of the coupling protrusions 110.

At this time, a light-transmitting surface 163 is formed at one end portion of the first prism 16, and as shown in FIG. 5A, the embodiment is constructed such that the light-transmitting surface 163 is formed in an inclined direction with respect to the longitudinal direction of the first prism 16; however, the disclosure is not limited thereto, and the light-transmitting surface 163 may be formed in a direction perpendicular to the longitudinal direction of the first prism 16. The light-transmitting surface 163 is the portion via which the light, which has passed through the lens 15, is introduced into the first prism 16.

Figure 6A:
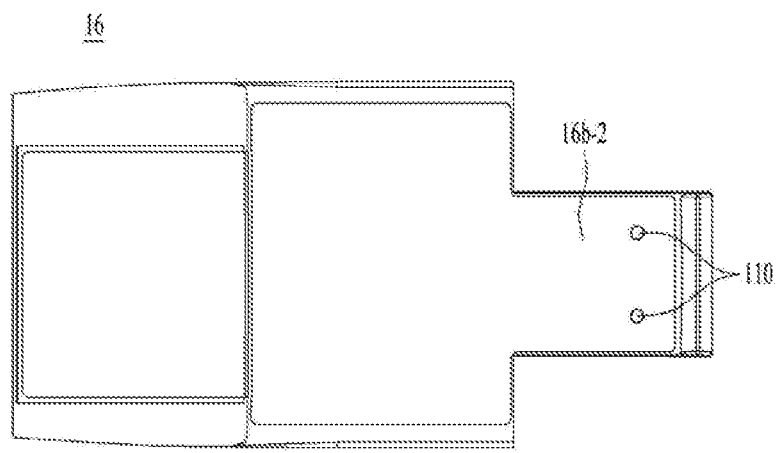
FIGS. 6A and 6B are views for explaining the coupling state between the first prism and the base according to a further embodiment.
Figure 6B:
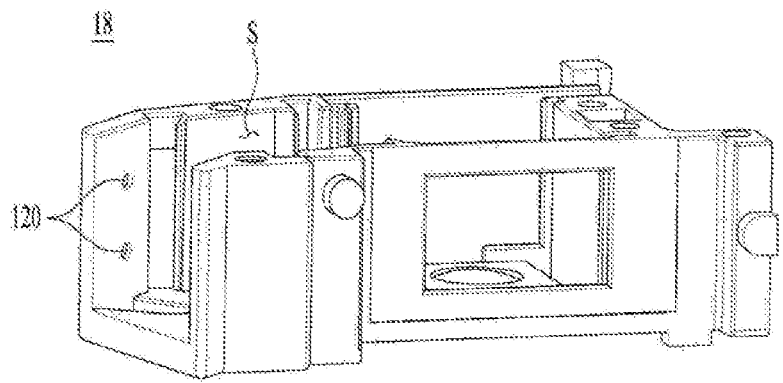

FIGS. 6A and 6B are views for explaining the coupling state between the first prism 16 and the base 18 according to a further embodiment. The fastening unit according to this embodiment, as shown in FIGS. 6A and 6B, may be constructed such that the coupling protrusions 110 protrude from the opposite side surface 16b-2 of the first prism 16 and the insert portions 120 are formed in the opposite side portion of the base 18 that corresponds to the positions of the coupling protrusions 110.

The opposite side surface 16b-2 of the first prism 16 refers to the surface that is opposite the one side surface 16b-1 shown in FIG. 5A, out of the two opposite side surfaces of the first prism 16, and the opposite side portion of the base 18 refers to the portion that faces the one side portion in which the insert portions 120 of the base 18 shown in FIG. 5B are formed.

The coupling protrusions 110 described in each of the above embodiments may be coupled to the insert portions 120 described in each of the above embodiments in an interference-fit manner and/or using an adhesive material.

Various kinds of adhesive materials may be used; however, epoxy-based materials, which have superior adhesive strength, are suitable. Further, in order to facilitate processing, an ultraviolet (UV) hardening epoxy is more suitable.

Meanwhile, the coupling protrusions 110 may protrude from each of the bottom surface 16a of the first prism 16 and the two opposite side surfaces, i.e. the one side surface 16b-1 of the first prism 16 and the opposite side surface 16b-2 of the first prism 16, and the insert portions 120 may be formed in each of the bottom of the base 18 and the two opposite side portions, i.e. the one side portion of the base 18 and the opposite side portion of the base 18, at positions corresponding to the positions of the coupling protrusions 110.

Alternatively, the insert portions 120 may be formed in a hole or recess configuration in each of the bottom surface 16a of the first prism 16 and the two opposite side surfaces, i.e. the one side surface 16b-1 of the first prism 16 and the opposite side surface 16b-2 of the first prism 16, and the coupling protrusions 110 may protrude from each of the bottom of the base 18 and the two opposite side portions, i.e. the one side portion of the base 18 and the opposite side portion of the base 18, at positions corresponding to the positions of the insert portions 120.

Figure 7A:
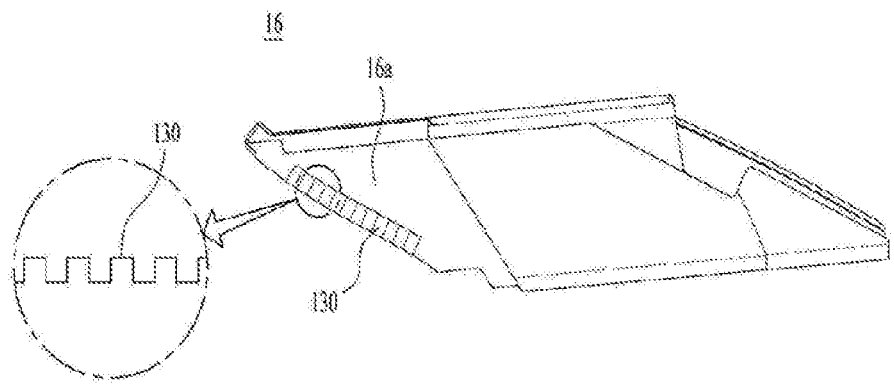
FIGS. 7A and 7B are views for explaining the coupling state between the first prism and the base according to a further embodiment.
Figure 7B:
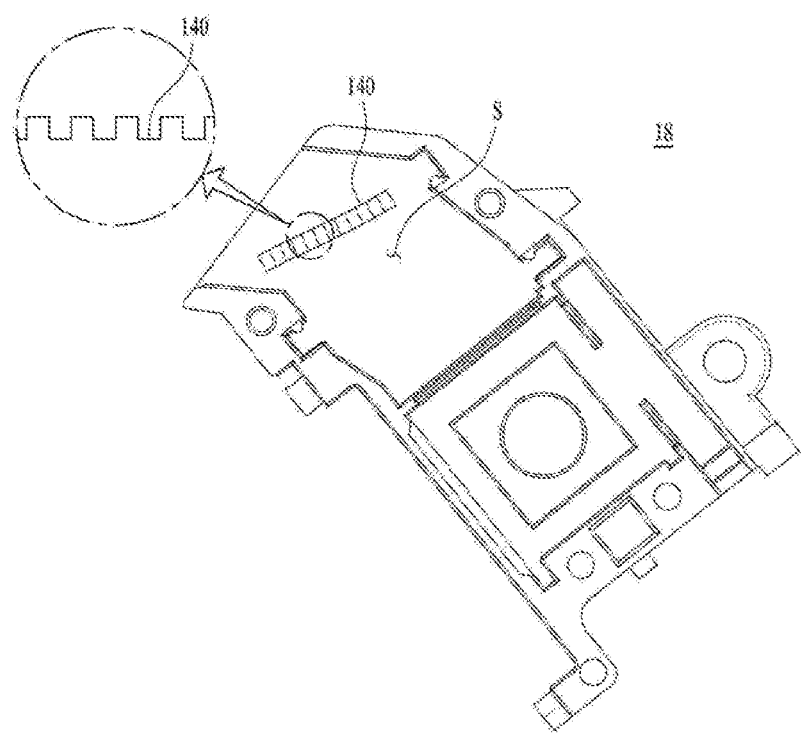

FIGS. 7A and 7B are views for explaining the coupling state between the first prism 16 and the base 18 according to a further embodiment.

The fastening unit according to this embodiment may include a first concave-convex portion 130, which is formed at an end portion of the first prism 16, and a second concave-convex portion 140, which is formed at an end portion of the base 18 that corresponds to the position of the first concave-convex portion 130 so as to mesh with the first concave-convex portion 130.

At this time, although the first concave-convex portion 130 and the second concave-convex portion 140, as shown in FIGS. 7A and 7b, are illustrated as having a rectangular shape, the disclosure is not limited thereto, and they may be formed in various other shapes, e.g. a triangular or wave shape.

Further, in the fastening unit according to this embodiment, as shown in FIGS. 7A and 7B, the first concave-convex portion 130 may be formed at the bottom surface 16a of the first prism 16, and the second concave-convex portion 140 may be formed at a portion of the bottom of the base 18 that corresponds to the position of the first concave-convex portion 130 so as to mesh with the first concave-convex portion 130.

At this time, the length, width, position, and number of the concave portions or the convex portions of the first concave-convex portion 130 may be suitably selected within the end portion of the bottom surface 16a of the first prism 16, which is the region that is coupled to the base 18.

Figure 8A:
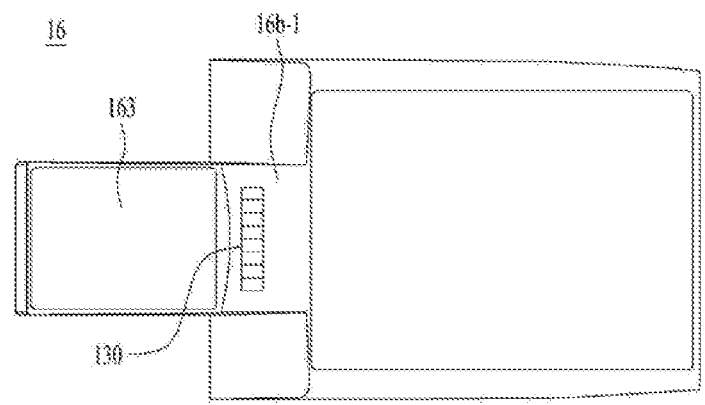
FIGS. 8A and 8B are views for explaining the coupling state between the first prism and the base according to a further embodiment.
Figure 8B:
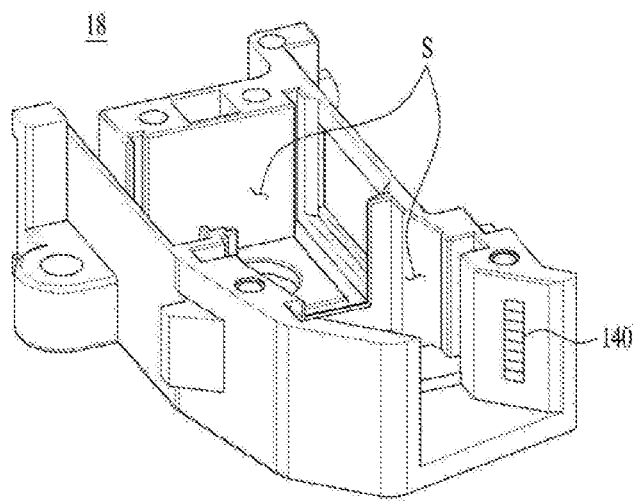

FIGS. 8A and 8B are views for explaining the coupling state between the first prism 16 and the base 18 according to a further embodiment. The fastening unit according to this embodiment, as shown in FIGS. 8A and 8B, may be constructed such that the first concave-convex portion 130 is formed at one side surface 16b-1 of the first prism 16 and the second concave-convex portion 140 is formed at the side portion of the base 18 that corresponds to the position of the first concave-convex portion 130 so as to mesh with the first concave-convex portion 130.

As this time, similar to the structure described above with reference to FIG. 5A, a light-transmitting surface 163 is formed at the end portion of the first prism 16, and as shown in FIG. 8A, the embodiment is constructed such that the light-transmitting surface 163 is formed in an inclined direction with respect to the longitudinal direction of the first prism 16; however, the disclosure is not limited thereto, and the light-transmitting surface 163 may be formed in a direction perpendicular to the longitudinal direction of the first prism 16.

Figure 9A:
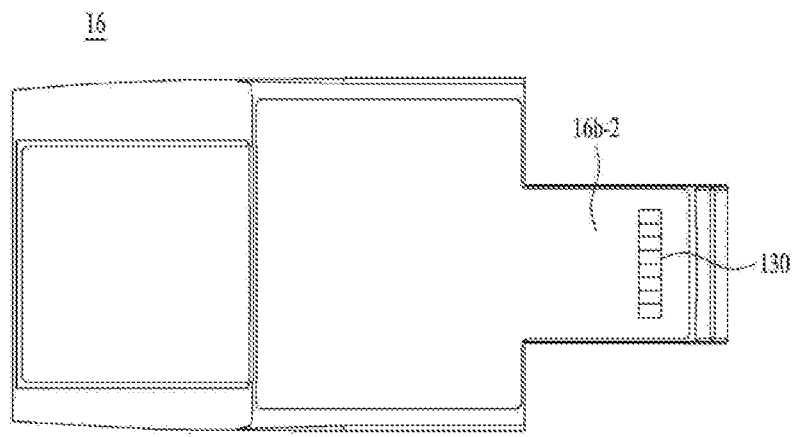
FIGS. 9A and 9B are views for explaining the coupling state between the first prism and the base according to a further embodiment.
Figure 9B:
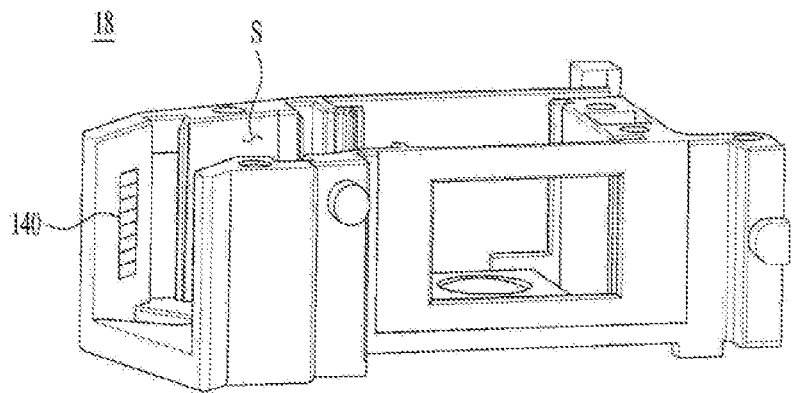

FIGS. 9A and 9B are views for explaining the coupling state between the first prism 16 and the base 18 according to a further embodiment. The fastening unit according to this embodiment, as shown in FIGS. 9A and 9B, may be constructed such that the first concave-convex portion 130 is formed at the opposite side surface 16b-2 of the first prism 16 and the second concave-convex portion 140 is formed at the opposite side portion of the base 18 that corresponds to the position of the first concave-convex portion 130 so as to mesh with the first concave-convex portion 130.

The opposite side surface 16b-2 of the first prism 16 refers to the surface that is opposite the one side surface 16b-1 shown in FIG. 8A, out of the two opposite side surfaces of the first prism 16, and the opposite side portion of the base 18 refers to the portion that faces the one side portion in which the second concave-convex portion 140 of the base 18 shown in FIG. 8B is formed.

The first concave-convex portion 130 and the second concave-convex portion 140 described in each of the above embodiments may mesh with each other in an interference-fit manner and/or using an adhesive material.

The first concave-convex portion 130 may be formed at each of the bottom surface 16a of the prism and the two opposite side surfaces, i.e. the one side surface 16b-1 of the first prism 16 and the opposite side surface 16b-2 of the first prism 16, and the second concave-convex portion 140 may be formed at each of the bottom of the base 18 and the two opposite side portions, i.e. the one side portion of the base 18 and the opposite side portion of the base 18, at a position corresponding to the position of the first concave-convex portion 130 so as to mesh with the first concave-convex portion 130.

According to the embodiment, when the prism is coupled to the base 18, an adhesive material may not be used at all, or the use thereof may be greatly reduced by applying an adhesive material only to the fastening unit, i.e. the coupling protrusions 110, the insert portions 120, the first concave-convex portion 130, or the second concave-convex portion 140, which are formed in the first prism 16 and the base 18. Therefore, it is possible to prevent deterioration of the quality of a playback image attributable to the presence of an adhesive material in the wearable display device and to simplify the process of assembling the wearable display device.

Figure 10:
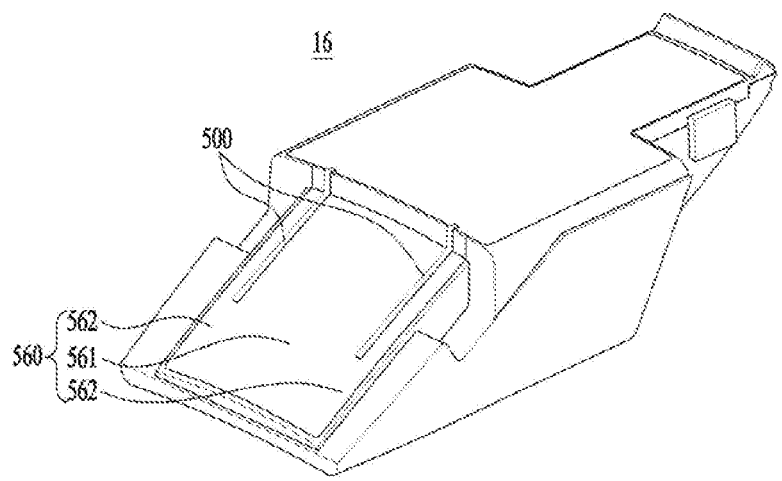
FIG. 10 is a perspective view illustrating the first prism in which adhesion grooves are formed according to one embodiment.
Figure 11:
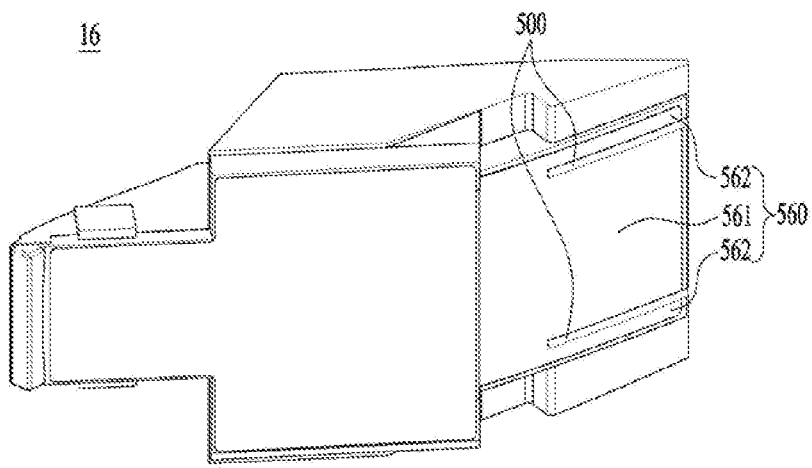
FIG. 11 is a perspective view illustrating the first prism in which the adhesion grooves are formed according to another embodiment.

FIG. 10 is a perspective view illustrating the first prism 16 in which adhesion grooves 500 are formed according to one embodiment. FIG. 11 is a perspective view illustrating the first prism 16 in which the adhesion grooves 500 are formed according to another embodiment.

The adhesion grooves 500 are the portions that are formed in at least one of the surface of the first prism 16 and the surface of the second prism 17, which are coupled to each other, in order to allow an adhesive agent to be introduced thereinto. The first prism 16 and the second prism 17 may be coupled to each other by the hardening of the adhesive agent introduced into the adhesion grooves 500.

In one example, the adhesion grooves 500, as shown in FIGS. 10 and 11, may be formed in the surface of the first prism 16. Specifically, the adhesion grooves 500 may be formed in marginal portions 562 of a first surface 560 of the first prism 16, which is coupled to a second surface 570 (refer to FIG. 12) of the second prism 17.

At this time, the first surface 560 may be formed in an inclined direction toward the user's eyeball E, and the adhesion grooves 500 may extend lengthwise in the direction in which the first surface 560 is inclined.

The reason for this is that a center portion 561 of the first surface 560 forms the path of light, through which image-forming light passes, and accordingly, it is necessary not to coat the center portion 561 with an adhesive agent in order to prevent a negative influence on the path and characteristics of the light that passes through the center portion 561.

Meanwhile, although the adhesion grooves 500, as shown in FIGS. 10 and 11, are formed in two opposite marginal portions 562 of the first surface 560, the disclosure is not limited thereto, and only a single adhesion groove may be formed in either one of the two opposite marginal portions 562.

Further, in one example, each of the adhesion grooves 500, as shown in FIGS. 10 and 11, may be formed in the configuration of a long groove, which has an open end and a closed opposite end in the longitudinal direction thereof. At this time, as shown in FIGS. 10 and 11, in the case in which a stepped portion is formed adjacent to the open end, grooves are additionally formed in the stepped portion so that the end of each of the adhesion grooves 500 is maintained open.

Meanwhile, the open end of each of the adhesion grooves 500 may not be formed in the first surface 560 but may be formed in either the front surface or the rear surface of the first prism 16 on the basis of the viewing direction of the eyeball E. For example, as shown in FIG. 10, the open end of each of the adhesion grooves 500 may be formed in the front surface of the first prism 16 on the basis of the viewing direction of the eyeball E. Alternatively, as shown in FIG. 11, the open end of each of the adhesion grooves 500 may be formed in the rear surface of the first prism 16.

Adhesive agents having various properties may be used as the adhesive agent for adhesion between the first prism 16 and the second prism 17. For example, an epoxy, a thermo-hardening adhesive agent, an optical-hardening adhesive agent or the like may be used, and a UV-hardening adhesive agent may be used as the optical-hardening adhesive agent.

Figure 12:
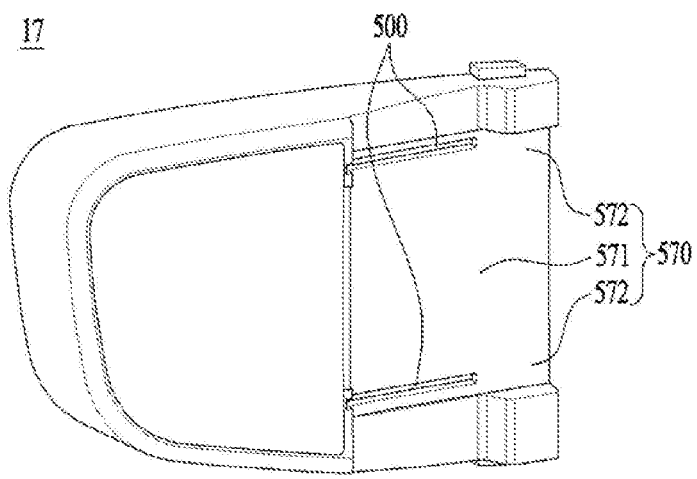
FIG. 12 is a perspective view illustrating a second prism in which the adhesion grooves are formed according to one embodiment.

FIG. 12 is a perspective view illustrating the second prism 17 in which the adhesion grooves 500 are formed according to one embodiment. The adhesion grooves 500 may be formed in the second surface 570 of the second prism 17. The second surface 570, similar to the first surface 560, may be formed in an inclined direction toward the eyeball E, and the adhesion grooves 500 may extend lengthwise in the direction in which the second surface 570 is inclined.

Meanwhile, the incident light, which forms an image to be displayed, is totally reflected to the eyeball E by the second surface 570, and the adhesion grooves 500 may be formed in regions other than the region from which the incident light is totally reflected.

At this time, total reflection of the incident light occurs at a center portion 571 of the second surface 570 of the second prism 17, and accordingly, the adhesion grooves 500 may be formed in marginal portions 572 of the second surface 570, which are spaced apart from the center portion 571 of the second surface 570, at which the total reflection occurs.

Meanwhile, although the adhesion grooves 500, as shown in FIG. 12, are formed in two opposite marginal portions 572 of the second surface 570, the disclosure is not limited thereto, and only a single adhesion groove may be formed in either one of the two opposite marginal portions 572.

Further, each of the adhesion grooves 500, as shown in FIG. 12, may be formed in the configuration of a long groove, which has an open end and a closed opposite end in the longitudinal direction thereof. At this time, as shown in FIG. 12, in the case in which a stepped portion is formed adjacent to the open end, grooves are additionally formed in the stepped portion, so that the end of each of the adhesion grooves 500 is maintained open.

Meanwhile, similar to the case of the first prism 16, the open end of each of the adhesion grooves 500 may not be formed in the second surface 570, but may be formed in either the front surface or the rear surface of the second prism 17 on the basis of the viewing direction of the eyeball E. Although, as shown in FIG. 12, the open end of each of the adhesion grooves 500 is formed in the rear surface of the second prism 17 on the basis of the viewing direction of the eyeball E, the open end may alternatively be formed in the front surface of the second prism 17.

Figure 13:
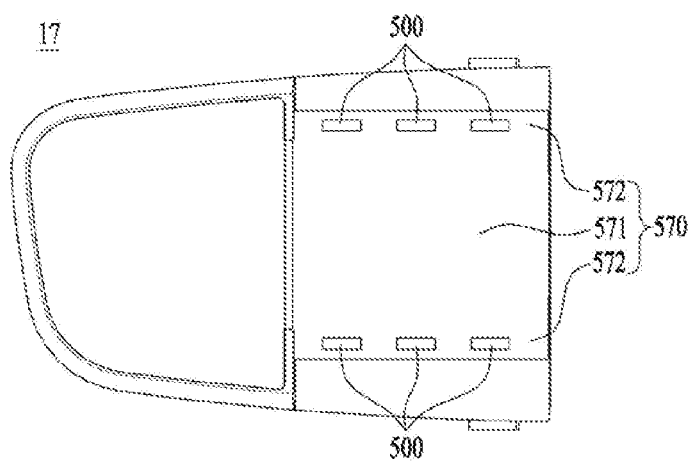
FIG. 13 is a front view illustrating the second prism in which the adhesion grooves are formed according to another embodiment.
Figure 14:
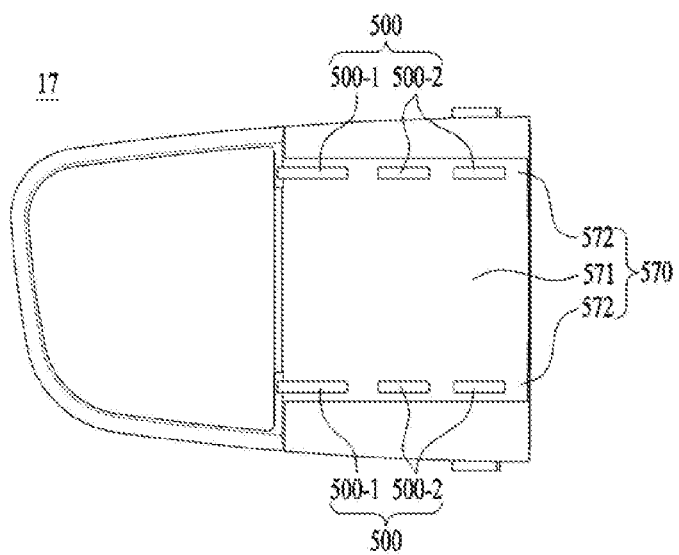
FIG. 14 is a front view illustrating the second prism in which the adhesion grooves are formed according to a further embodiment.

Since the adhesion grooves 500 formed in the first surface 560 and the adhesion grooves 500 formed in the second surface 570 may have the same or a highly similar structure, only the second surface 570 of the second prism 17, in which other exemplary adhesion grooves 500 are formed, is illustrated in FIGS. 13 and 14.

FIG. 13 is a front view illustrating the second prism 17 in which the adhesion grooves 500 are formed according to another embodiment.

As shown in FIG. 13, the adhesion grooves 500 according to this embodiment may include a plurality of grooves, which do not communicate with each other and are arranged in the direction in which the first surface 560 or the second surface 570 is inclined while being spaced apart from each other. At this time, each of the adhesion grooves 500 may be formed such that both of the two opposite ends thereof are closed.

An adhesive agent is introduced into the respective adhesion grooves 500, and is then hardened while the first surface 560 and the second surface 570 are in contact with each other, thereby enabling the first prism 16 and the second prism 17 to be secured to each other by means of the adhesive agent.

Although the adhesion grooves 500 are illustrated as having a rectangular planar shape in FIG. 13, the disclosure is not limited thereto, and the adhesion grooves 500 may be formed to have polygonal, curved or various other shaped cross-sections.

FIG. 14 is a front view illustrating the second prism 17 in which the adhesion grooves 500 are formed according to a further embodiment. As shown in FIG. 14, the adhesion grooves 500 according to this embodiment may include a first adhesion groove 500-1 and second adhesion grooves 500-2.

The first adhesion groove 500-1 may be formed in the configuration of a long groove, which has an open end and a closed opposite end in the longitudinal direction thereof, and the second adhesion grooves 500-2 may include a plurality of grooves, which do not communicate with each other and are arranged in the direction in which the first surface 560 or the second surface 570 is inclined while being spaced apart from each other.

That is, the adhesion grooves 500 in the embodiment shown in FIG. 14 may be formed by combining those in the embodiments shown in FIGS. 12 and 13. Also, in the embodiments shown in FIGS. 13 and 14, for the above-mentioned reason, the adhesion grooves are formed in the marginal portions 572 of the first surface 560 or the second surface 570.

Meanwhile, although the adhesion grooves 500, as shown in FIGS. 13 and 14, are formed in the two opposite marginal portions 572 of the second surface 570, the disclosure is not limited thereto, and only a single adhesion groove may be formed in either one of the two opposite marginal portions 572.

Figure 15:
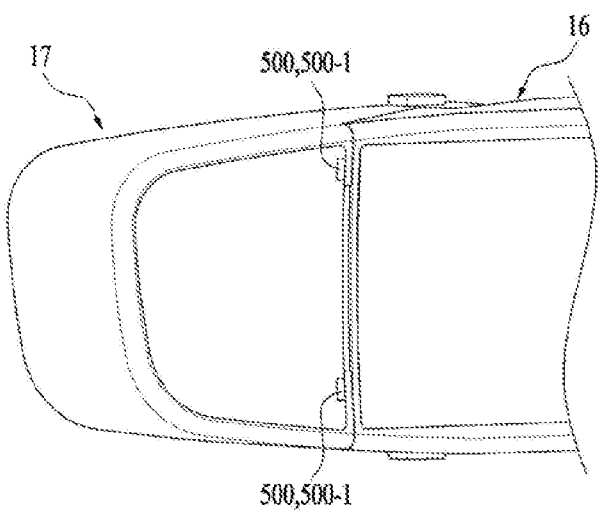
FIG. 15 is a perspective view illustrating a part of the wearable display device in which the adhesion grooves are formed according to one embodiment.

FIG. 15 is a perspective view illustrating a part of the wearable display device in which the adhesion grooves 500 are formed according to one embodiment. As shown in FIG. 15, the adhesion grooves 500 may be formed in the first surface 560 of the second prism 17.

At this time, in the case in which the adhesion grooves 500 have the configuration shown in FIG. 12, that is, in the case in which each of the adhesion grooves extends lengthwise in the direction in which the second surface 570 is inclined and is formed in the configuration of a long groove having an open end and a closed opposite end in the longitudinal direction thereof, it is possible to easily couple the first prism 16 and the second prism 17 to each other.

That is, while the first prism 16 and the second prism 17 are in contact with each other, an adhesive agent is introduced into each of the adhesion grooves 500 through the open end thereof, and the introduced adhesive agent is hardened, thereby enabling the first prism 16 and the second prism 17 to be secured to each other by means of the adhesive agent. At this time, since the end that is opposite the open end is closed, there is no concern of leakage of the adhesive agent, introduced into each of the adhesion grooves, through the end that is opposite the open end.

Figure 16:
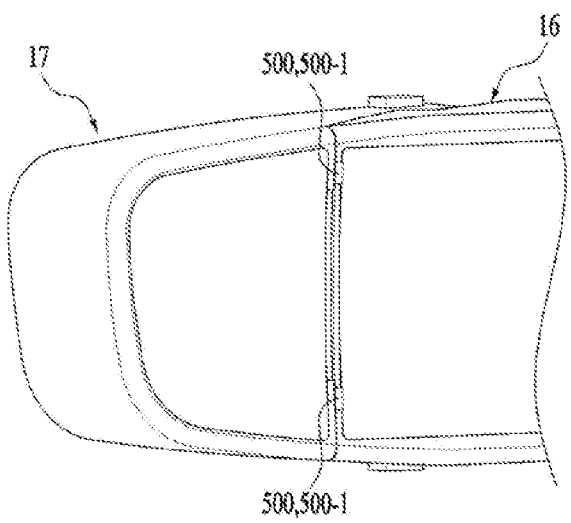
FIG. 16 is a perspective view illustrating a part of the wearable display device in which the adhesion grooves are formed according to another embodiment.
Figure 17:
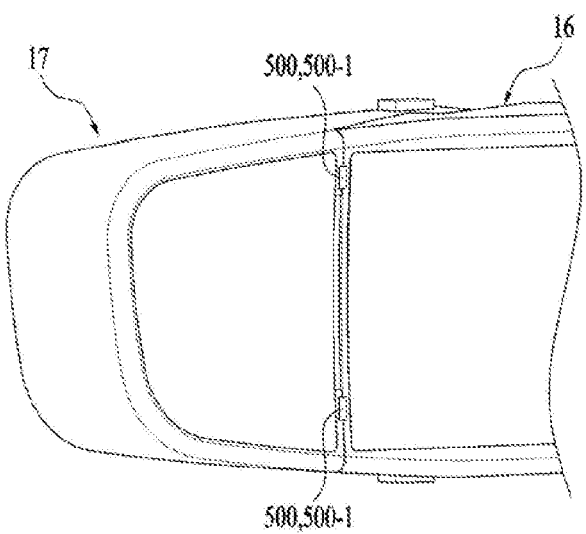
FIG. 17 is a perspective view illustrating a part of the wearable display device in which the adhesion grooves are formed according to a further embodiment.

FIG. 16 is a perspective view illustrating a part of the wearable display device in which the adhesion grooves 500 are formed according to another embodiment. FIG. 17 is a perspective view illustrating a part of the wearable display device in which the adhesion grooves 500 are formed according to a further embodiment.

As shown in FIG. 16, the adhesion grooves 500 may be formed in the first surface 560 of the first prism 16, and the concrete shape thereof is the same as described above. Similar to the above-described embodiment shown in FIG. 15, in the case in which the adhesion grooves 500 have the configuration shown in FIG. 17, it is possible to easily couple the first prism 16 and the second prism 17 to each other using an adhesive agent.

As shown in FIG. 17, the adhesion grooves 500 may be formed in both the first prism 16 and the second prism 17 so as to face each other. Similarly, in the case in which the adhesion grooves 500 have the configuration shown in FIGS. 11 and 12, it is possible to easily couple the first prism 16 and the second prism 17 to each other using an adhesive agent.

Further, in the case in which the adhesion grooves 500 have the configuration shown in FIGS. 13 and 14, the plurality of grooves, e.g. the first adhesion groove 500-1 and the second adhesion grooves 500-2 shown in FIG. 14, may also be formed in both the first prism 16 and the second prism 17 so as to face each other.

At this time, although the adhesion grooves 500 are illustrated as having a cross-section having a rectangular shape, one end of which is open, in the above drawings, the disclosure is not limited thereto. That is, other than the rectangular shape having one open end, the adhesion grooves 500 may be formed to have V-shaped, curved or various other shaped cross-sections.

Meanwhile, as shown in FIG. 13, in the case in which each of the adhesion grooves 500 is formed to have two opposite ends that are closed, each of the adhesion grooves 500 may not be formed in the configuration in which one end thereof is open, as shown in FIGS. 15 and 16.

According to the embodiments, by virtue of the adhesion grooves formed in the surface of the first prism or the second prism, there is an effect in that the first prism and the second prism are easily and securely coupled to each other using an adhesive agent.

In addition, since the adhesion grooves prevent the adhesive agent from flowing down to the center portions of the surfaces of the first prism and the second prism, which are coupled to each other and at which the path of light is formed or at which total reflection occurs, it is possible to improve the resolution and definition of a screen of the wearable display device.

Figure 18:
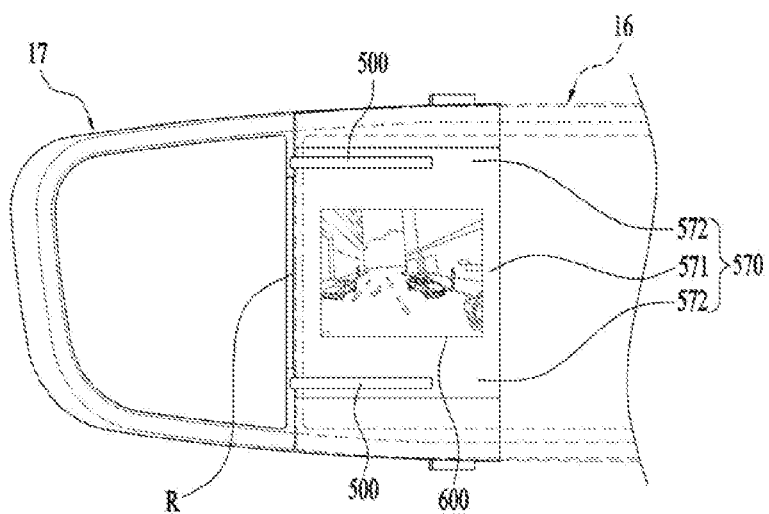
FIG. 18 is a view illustrating the formation of a display screen according to an embodiment.

FIG. 18 is a view illustrating the formation of a display screen 600 according to an embodiment. The display screen 600 may display an image thereon, which the user is capable of viewing with the eyeball E.

The display screen 600 may be formed at the center portion 571 of the second surface 570 of the second prism 17. That is, the adhesion grooves 500 are formed in the marginal portions 572 of the second surface 570, an adhesive agent is introduced into the adhesion grooves 500, the first prism 16 and the second prism 17 are coupled to each other by the hardening of the adhesive agent, and the incident light, which forms an image to be displayed to the eyeball E, is totally reflected by the center portion 571 of the second surface 570 and is transmitted to the eyeball E.

Therefore, the display screen 600 may be formed at the center portion 571 of the second surface 570, which is the total-reflection region. At this time, a space R may be formed in the center portion 571 of the coupling region between the first surface 560 and the second surface 570 in order to improve the resolution of the display screen 600 and the image quality by enabling the total reflection to more effectively occur at the center portion 571 of the second surface 570.

Figure 19:
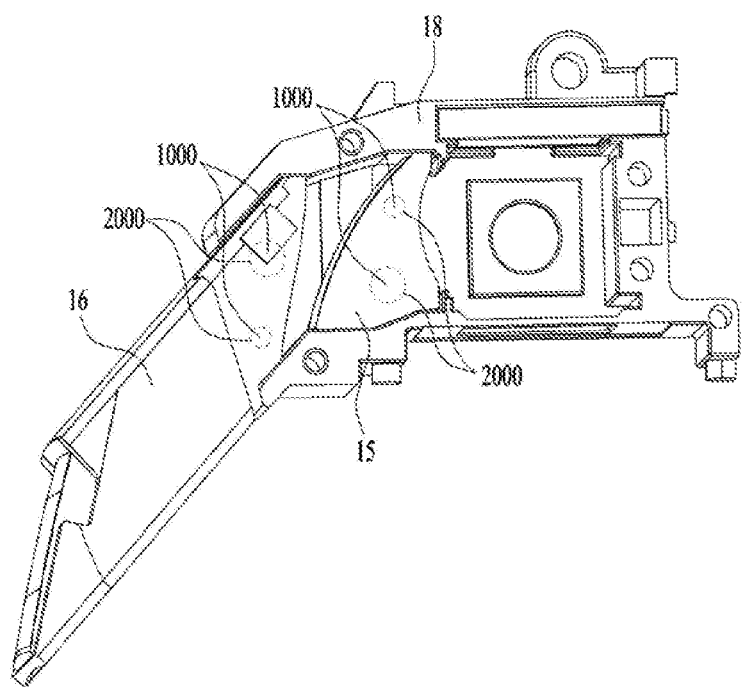
FIG. 19 is a plan view illustrating a boss and an insert recess according to an embodiment.

FIG. 19 is a plan view illustrating a boss 1000 and an insert recess 2000 according to an embodiment. The wearable display device according to the embodiment may include a coupling unit. The coupling unit may serve to couple at least one of the lens 15 and the prism to an inner bottom surface 1810 of the base 18 on the basis of the user's viewing direction.

As described above, the prism may include the first prism 16 and the second prism 17, and in this embodiment, the prism, which is coupled to the base 18, may be the first prism 16.

The coupling unit may include a boss 1000, which is formed so as to protrude, and an insert recess 2000, which is formed at a position corresponding to the boss 1000 and into which the boss 1000 is inserted. The boss 1000 may be provided in a plural number, and the insert recess 2000 may be provided in the same number as the number of bosses 1000.

From a point of view of easier processing and firmer coupling, the bosses 1000 may be formed integrally with the base 18, the lens 15 or the prism. The bosses 1000 may be formed integrally with the base 18, the lens 15 or the prism through injection molding or other methods.

At this time, at least some of the bosses 1000 may be formed to have respectively different cross-sectional areas, and the insert recesses 2000 may be formed to have cross-sectional areas that are equivalent to or greater than the cross-sectional areas of the respective bosses 1000.

The cross-sectional areas of the bosses 1000 may be formed to be as large as possible in order to enhance the coupling force between the base 18 and the lens 15 or the prism and to prevent shaking; however, the sizes of the cross-sectional area may be suitably adjusted in accordance with the structure of the base 18 and the lens 15 or the prism.

For example, as shown in FIG. 19, the cross-sectional area of the boss 1000, which is located in a large-area portion of the coupling region of the base 18, to which the prism or the lens 15 is coupled, may be relatively large, and the cross-sectional area of the boss 1000, which is located in a small-area portion of the coupling region, may be relatively small.

Meanwhile, although it is illustrated in FIG. 19 that four bosses 1000 are formed, and more specifically, that two bosses 1000 are formed in the region to which the prism is coupled and two bosses 1000 are formed in the region to which the lens 15 is coupled, the disclosure is not limited thereto, and three or more bosses 1000 may be formed in each of the above regions and three or more insert recesses 2000 may be formed in each of the above regions so as to correspond to the number of bosses 1000. Hereinafter, for convenience of explanation, an exemplary structure in which two bosses 1000 or two insert recesses 2000 are formed in each of the above regions will be described.

At this time, the bosses 1000 may be inserted into the insert recesses 2000 in, for example, an interference-fit manner. The prism or the lens 15 may be securely coupled to the base 18 by the interference-fit method.

Meanwhile, the prism or the lens 15 may be more securely coupled to the base 18 by bonding the bosses 1000 to the insert recesses 2000 using an adhesive agent. Here, adhesive agents having various properties may be used. For example, an epoxy, a thermo-hardening adhesive agent, an optical-hardening adhesive agent or the like may be used, and a UV-hardening adhesive agent may be used as the optical-hardening adhesive agent.

Further, although the bosses 1000, as shown in FIG. 19, are illustrated as having a circular-shaped cross-section, the disclosure is not limited thereto. That is, the bosses 1000 may be formed to have circular, elliptical, polygonal or various other shaped cross-sections.

Figure 20:
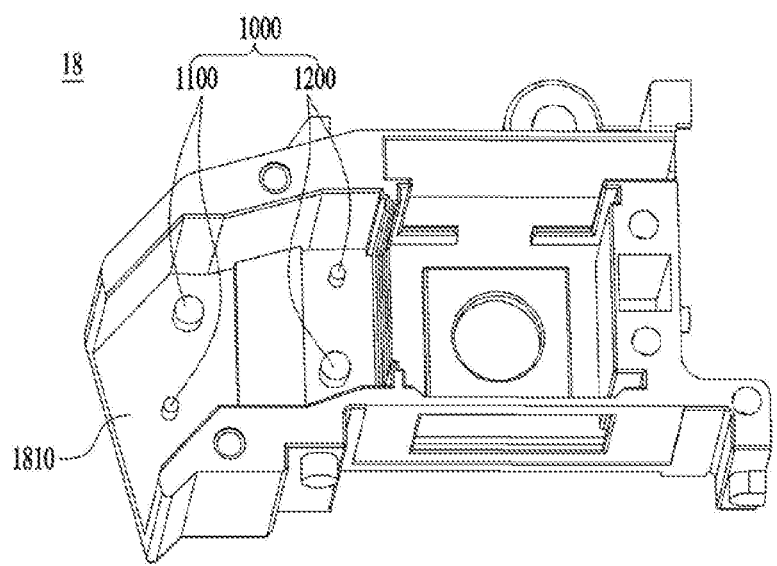
FIG. 20 is a perspective view illustrating the base in which the boss is formed according to an embodiment.

FIG. 20 is a perspective view illustrating the base 18 in which the bosses 1000 are formed according to an embodiment. As shown in FIG. 20, the bosses 1000 may be formed on the inner bottom surface 1810 of the base 18. At this time, the insert recesses 2000 may be formed in a portion of the bottom surface of the lens 15 or the prism that corresponds to the positions of the bosses 1000 of the base 18.

Specifically, the bosses 1000 may include a first boss 1100, which is inserted into the insert recess 2000 formed in the lens 15, and a second boss 1200, which is inserted into the insert recess 2000 formed in the first prism 16, and the first boss 1100 and the second boss 1200, as shown in FIG. 20, may be respectively provided in a plural number.

At this time, for example, the plurality of first bosses 1100 may be arranged while being spaced a suitable distance apart from each other, so as to minimize shaking of the first prism 16 relative to the base 18 in the structure in which the first prism 16 is coupled to the base 18. The distance may be appropriately selected in consideration of the number of first bosses 1100 and the cross-sectional area of each one.

Further, the arrangement position of the first bosses 1100 may be appropriately selected so as to minimize shaking of the first prism 16 relative to the base 18.

Meanwhile, the above description of the first bosses 1100 may be identically applied to the second bosses 1200, which are inserted into the insert recesses 2000 in the first prism 16.

Figure 21:
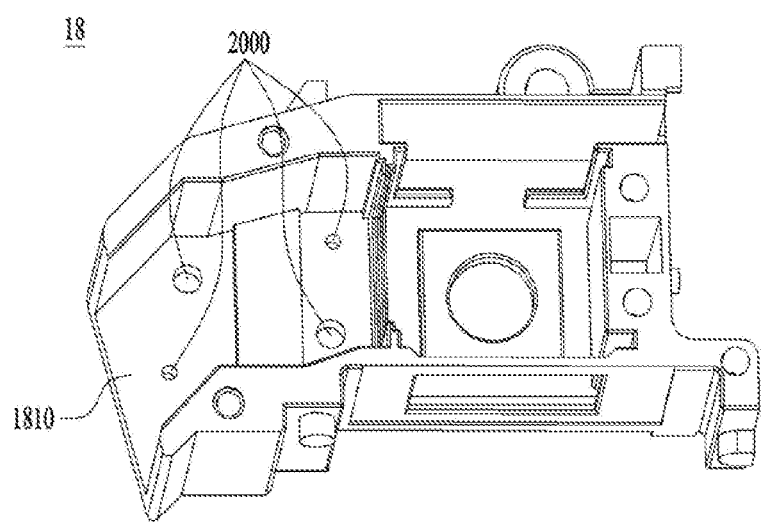
FIG. 21 is a perspective view illustrating the base in which the insert recess is formed according to an embodiment.

FIG. 21 is a perspective view illustrating the base 18 in which the insert recesses 2000 are formed according to an embodiment. As shown in FIG. 21, the insert recesses 2000 may be formed in the inner bottom surface 1810 of the base 18. At this time, the bosses 1000 may be formed on a portion of the bottom surface of the lens 15 or the prism that corresponds to the positions of the bosses 1000 of the base 18.

Specifically, third bosses 1300 (refer to FIG. 23), which are formed on a bottom surface 1510 of the lens 15, may be coupled to the insert recesses 2000 formed in the region to which the lens 15 is coupled, and fourth bosses 1400 (refer to FIG. 25), which are formed on a bottom surface 1610 of the first prism 16, may be coupled to the insert recesses 2000 formed in the region to which the first prism 16 is coupled.

Figure 22:
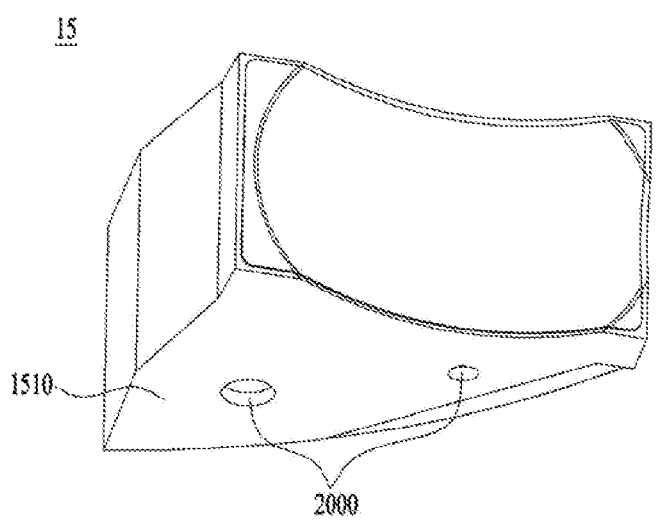
FIG. 22 is a perspective view illustrating a lens that has the insert recess formed in the bottom surface thereof according to an embodiment.

FIG. 22 is a perspective view illustrating the lens 15 that has the insert recesses 2000 formed in the bottom surface 1510 thereof according to an embodiment. As shown in FIG. 22, the insert recesses 2000 may be formed in the bottom surface 1510 of the lens 15, and the bosses 1000, which are coupled to the insert recesses 2000, may be formed on the inner bottom surface 1810 of the base 18. At this time, the bosses 1000 may be the first bosses 1100, which are formed on the portion of the bottom surface 1810 of the base 18 to which the lens 15 is coupled.

Figure 23:
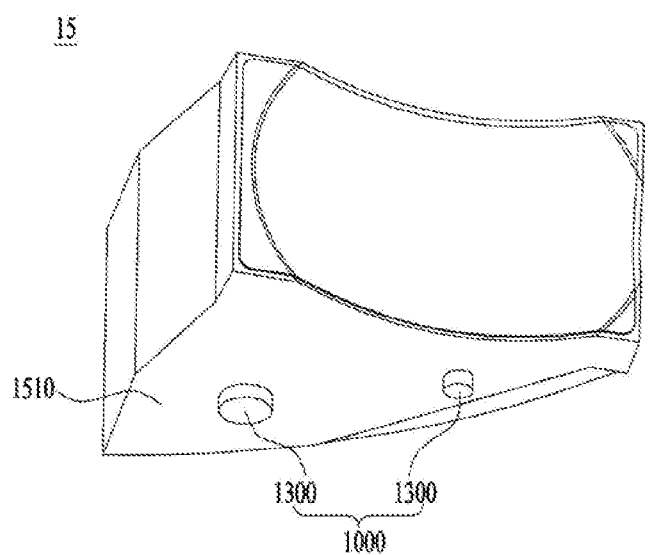
FIG. 23 is a perspective view illustrating the lens that has the boss formed on the bottom surface thereof according to an embodiment.

FIG. 23 is a perspective view illustrating the lens 15 that has the bosses 1000 formed on the bottom surface 1510 thereof according to an embodiment. As shown in FIG. 23, third bosses 1300 may be formed on the bottom surface 1510 of the lens 15, and the insert recesses 2000, into which the third bosses 1300 are inserted, may be formed in the portion of the inner bottom surface 1810 of the base 18 to which the lens 15 is coupled.

Figure 24:
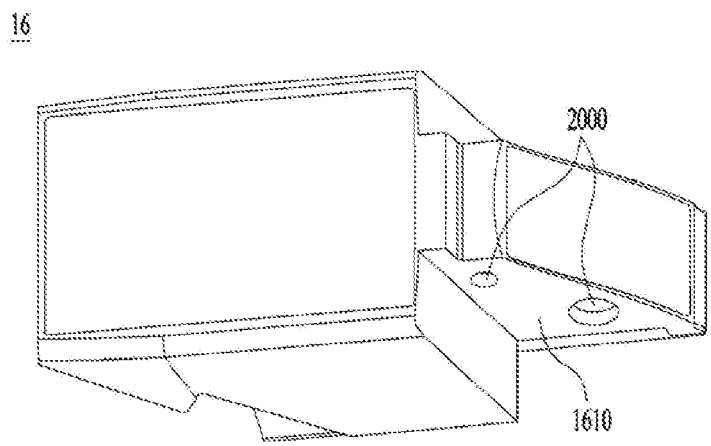
FIG. 24 is a perspective view illustrating the first prism that has the insert recess formed in the bottom surface thereof according to an embodiment.

FIG. 24 is a perspective view illustrating the first prism 16 that has the insert recesses 2000 formed in the bottom surface 1610 thereof according to an embodiment. As shown in FIG. 24, the insert recesses 2000 may be formed in the bottom surface 1610 of the first prism 16, and the bosses 1000, which are coupled to the insert recesses 2000, may be formed on the bottom surface 1610 of the base 18. At this time, the bosses 1000 may be the second bosses 1200, which are formed on the portion of the inner bottom surface 1810 of the base 18 to which the first prism 16 is coupled.

In particular, the insert recesses 2000 may be formed in the bottom surface 1610 of the portion of the first prism 16 that is to be coupled to the base 18.

Figure 25:
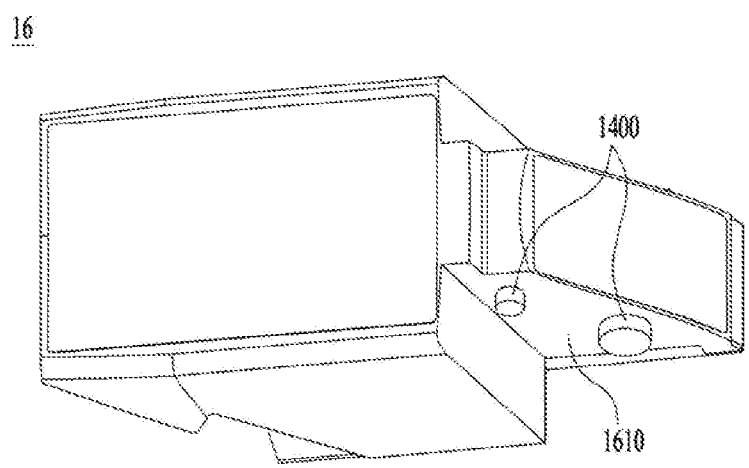
FIG. 25 is a perspective view illustrating the first prism that has the boss formed on the bottom surface thereof according to an embodiment.

FIG. 25 is a perspective view illustrating the first prism 16 that has the bosses 1000 formed on the bottom surface 1610 thereof according to an embodiment. As shown in FIG. 25, fourth bosses 1400 may be formed on the bottom surface 1610 of the first prism 16, and the insert recesses 2000, into which the fourth bosses 1400 are inserted, may be formed in the portion of the inner bottom surface 1810 of the base 18 to which the first prism 16 is coupled.

In particular, the fourth bosses 1400 may be formed on the bottom surface 1610 of a portion of the first prism 16 that is to be coupled to the base 18.

Meanwhile, similar to the first bosses 1100, the second bosses 1200, the third bosses 1300 and the fourth bosses 1400 may be respectively provided in a plural number.

Figure 26:
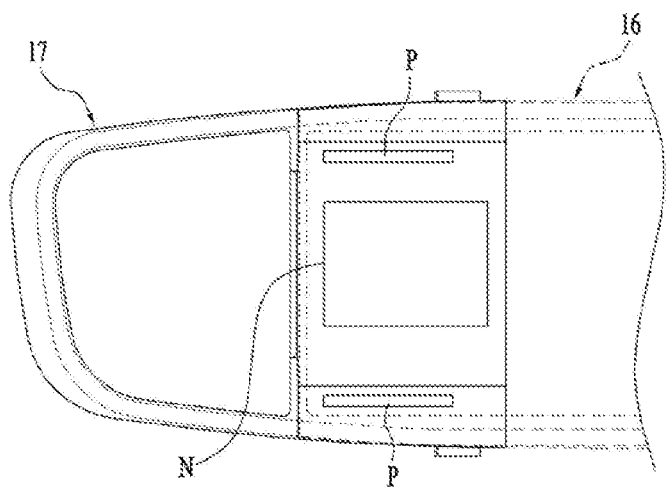
FIG. 26 is a view illustrating the formation of a display screen according to another embodiment.

FIG. 26 is a view illustrating the formation of a display screen N according to another embodiment. The prism may include a first prism 16 and a second prism 17, and the first prism 16 and the second prism 17 may be coupled to each other by applying an adhesive agent P to marginal portions of the end portions thereof that face each other.

At this time, adhesive agents having various properties may be used for the adhesive agent P. For example, an epoxy, a thermo-hardening adhesive agent, an optical-hardening adhesive agent or the like may be used, and a UV-hardening adhesive agent may be used as the optical-hardening adhesive agent.

The center portion of the end portion of the first prism 16 is the path of light, through which the image-forming light transmitted from the lens 15 passes, and the center portion of the end portion of the second prism 17 is the region from which the image-forming light transmitted from the first prism 16 is totally reflected.

Therefore, when the first prism 16 and the second prism 17 are coupled to each other, for the above reason, the adhesive agent P may be coated on the marginal portions of the end portions of the first prism 16 and the second prism 17 that face each other, in order to prevent the adhesive agent P from exerting a negative influence on the image-forming light.

The display screen N may be formed at the center portion of the end portion of the second prism 17, at which total reflection occurs. The display screen N may display an image thereon, which the user is capable of viewing with the eyeball E.

At this time, a space may be formed between the center portions of the end portions of the first prism 16 and the second prism 17 that face each other, in order to improve the resolution of the display screen N and the image quality by enabling total reflection to more effectively occur at the center portion of the end portion of the second prism 17.

According to the embodiments, the bosses 1000 and the insert recesses 2000, which are disposed so as to face the bosses 1000, are formed in the bottom surface 1510 of the lens 15, the bottom surface of the prism and the inner bottom surface 1810 of the base 18 so as to be coupled to each other, and the bosses 1000 and the insert recesses 2000 are respectively provided in a plural number, thereby achieving secure coupling between the lens 15 and the base 18 and between the prism and the base 18.

Further, as a result of the secure coupling between the base 18 and the lens 15 or the prism, there is an effect in that shaking of the lens 15 or the prism is restricted, and consequently the resolution and the image quality realized by the wearable display device are improved.

Further, since the lens 15 and the prism are secured to the inner bottom surface 1810, rather than the inner side surface, of the base 18, there is an effect in that it is not necessary to form an additional structure, for coupling the lens 15 and the prism to the base 18, on the inner side surface of the base 18, and consequently it is possible to manufacture a wearable display device having a slim profile.

Although only a limited number of embodiments have been described above, various other embodiments are possible. The technical contents of the above-described embodiments may be combined into various forms as long as they are not incompatible with one another, and thus may be implemented in new embodiments.

INDUSTRIAL APPLICABILITY

Since the fastening unit has an effect of enhancing the performance of the wearable display device by maintaining a stable path of light, the embodiments have industrial applicability.

The invention claimed is:

1. A wearable display device comprising:
a base;
a lens disposed in the base;
a first prism configured to adjust a path of light introduced from the lens;
a second prism coupled to the first prism; and
a fastening unit comprising a first coupling portion and a second coupling portion,
wherein the first coupling portion comprises coupling protrusions formed at one of the first prism and the base, and the second coupling portion comprises insert portions formed at the other one of the first prism and the base,
wherein each of the coupling protrusions is coupled to a corresponding one of the insert portions so as to restrict movement of the first prism relative to the base, and
wherein the first prism comprises a first adhesion groove and the second prism comprises a second adhesion groove, one end of the first adhesion groove and one end of the second adhesion groove being communicably connected.

2. The wearable display device according to claim 1, wherein the coupling protrusions are formed on an end portion of the first prism, and the insert portions are formed in an end portion of the base at positions corresponding to positions of the coupling protrusions and formed with a same number as a number of the coupling protrusions.

3. The wearable display device according to claim 1, wherein the insert portions are formed in a hole or recess configuration to allow the coupling protrusions to be inserted thereinto, and the coupling protrusions are coupled to the insert portions by at least one of an interference-fit manner and an adhesive material.

4. The wearable display device according to claim 1, wherein the coupling protrusions protrude from a bottom surface of the first prism, and the insert portions are formed in a bottom of the base at positions corresponding to positions of the coupling protrusions.

5. The wearable display device according to claim 1, wherein the coupling protrusions protrude from at least one of two opposite side surfaces of the first prism, and the insert portions are formed in at least one of two opposite side portions of the base at positions corresponding to positions of the coupling protrusions.

6. The wearable display device according to claim 1, wherein the coupling protrusions protrude from a bottom surface and two opposite side surfaces of the first prism, and the insert portions are formed in a bottom and two opposite side portions of the base at positions corresponding to positions of the coupling protrusions.

7. The wearable display device according to claim 1, wherein the first coupling portion is formed as a first concave convex portion, and
the second coupling portion is formed as a second concave convex portion, and meshes with the first concave convex portion.

8. The wearable display device according to claim 1, wherein
the coupling protrusions are formed on an end portion of the base, and the insert portions are formed in an end portion of the first prism at positions corresponding to positions of the coupling protrusions and formed with a same number as a number of the coupling protrusions.

9. The wearable display device according to claim 1, wherein the coupling protrusions protrude from a bottom surface and two opposite side surfaces of the base, and the insert portions are formed in a bottom and two opposite side portions of the first prism at positions corresponding to positions of the coupling protrusions.

10. The wearable display device according to claim 1, further comprising a second prism coupled to the first prism.

11. The wearable display device according to claim 10, wherein at least one of the first prism and the second prism has an adhesion groove for receiving an adhesive agent introduced thereinto, and
wherein the adhesion is formed in at least one of a first surface of the first prism and a second surface of the second prism, and the first surface of the first prism is configured to be coupled to the second surface of the second prism.

12. The wearable display device according to claim 11, wherein the adhesion groove is formed in at least one of a rectangular shape, a V shape, and a curved shape in which one side of a cross section is opened.

13. The wearable display device according to claim 11, wherein the adhesion groove comprises:
a first adhesion groove formed in the first prism; and
a second adhesion groove formed in the second prism and facing the first adhesion groove.

14. The wearable display device according to claim 11, wherein the second surface comprises a center portion and marginal portions spaced apart from the center portion, and wherein a total-reflection is configured to occur at the center portion, and the adhesion groove is formed in the marginal portions.

15. The wearable display device according to claim 1, comprising:
a display unit disposed in the base;
a beam ejection unit disposed in the base and receiving image-forming light from the display unit; and
a polarizer configured to polarize the image-forming light introduced from the display unit.

16. The wearable display device according to claim 1, wherein one of the lens and the base comprises at least one boss, and the other one of the lens and the base comprises at least one insert recess coupled to the at least one boss.

17. The wearable display device according to claim 16, wherein the at least one boss is formed an inner bottom surface of the base and the at least one insert recess is formed in a bottom surface of the lens.

18. The wearable display device according to claim 16, wherein the at least one boss is formed an inner bottom surface of the prism and the at least one insert recess is formed in a bottom surface of the base.

* * * * *